June 28, 1966 K. G. SKINNER 3,257,840
APPARATUS FOR COMPARATIVE DETERMINATION
OF THERMAL CONDUCTIVITY
Original Filed July 24, 1961 2 Sheets-Sheet 2
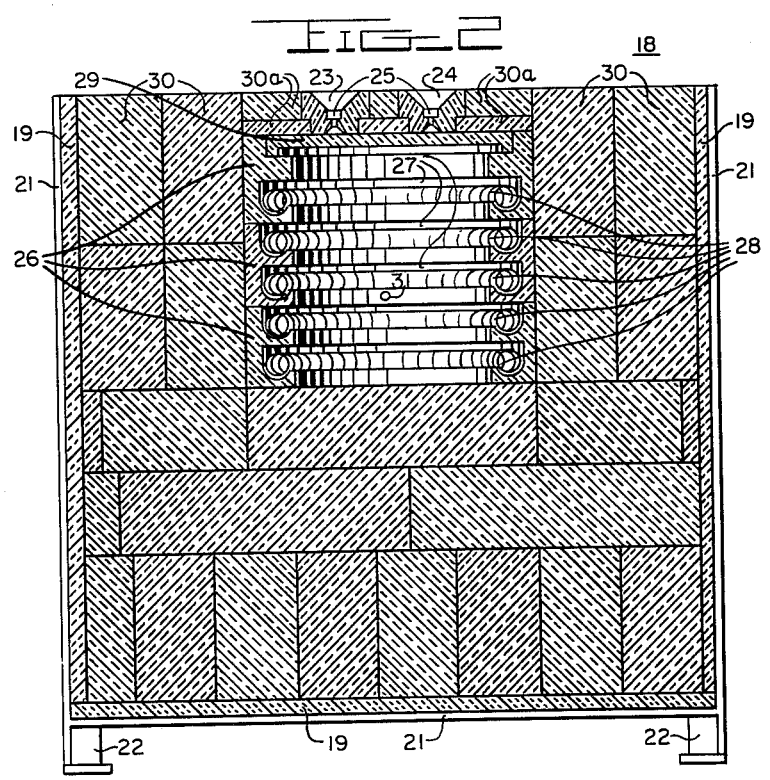
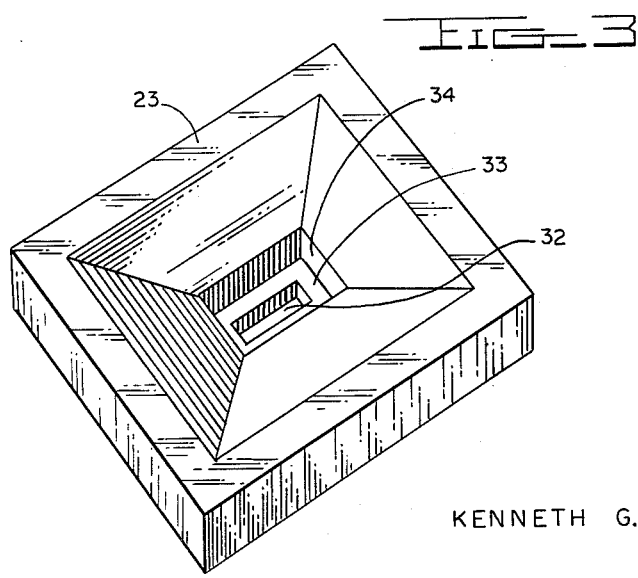
INVENTOR
KENNETH G. SKINNER
BY
ATTORNEY United States Patent Office 3,257,840
Patented June 28, 1966

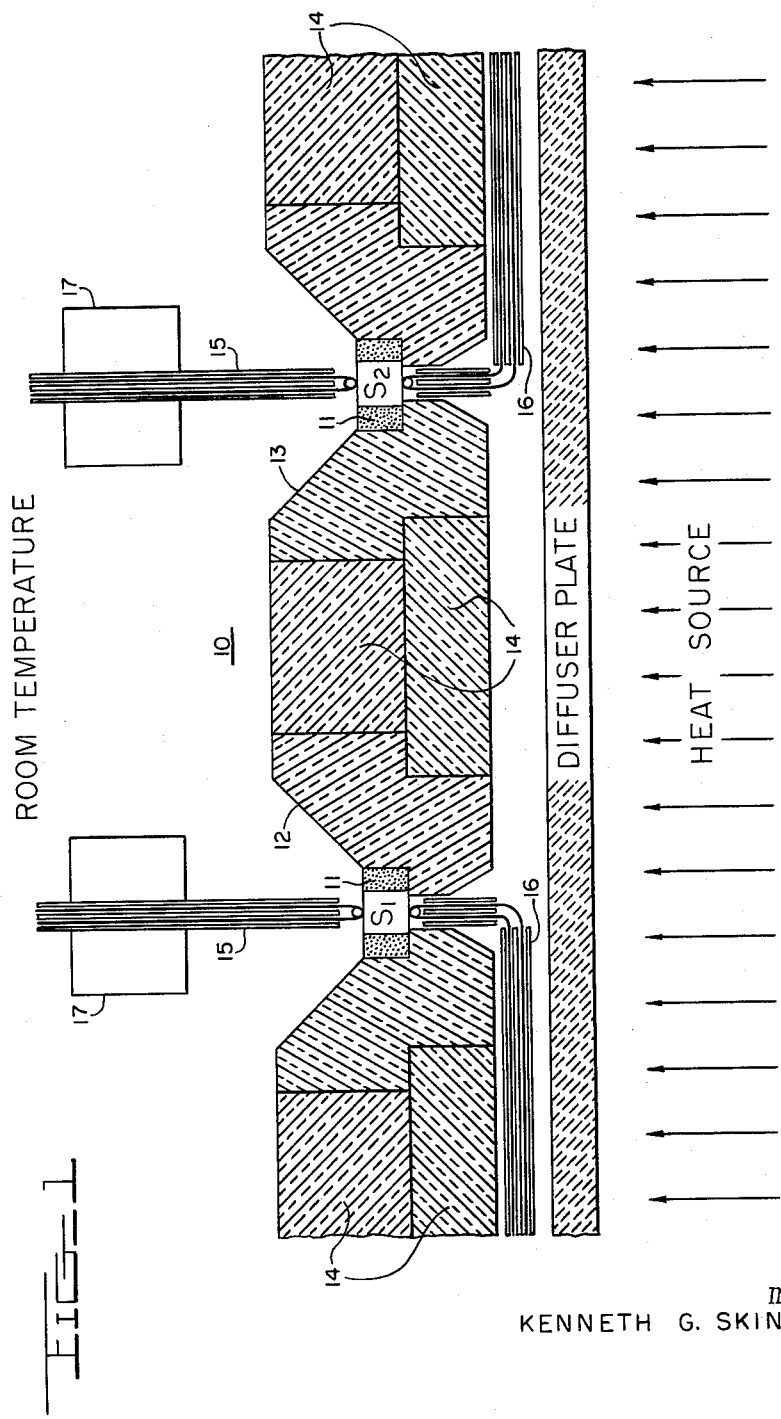

3,257,840
APPARATUS FOR COMPARATIVE DETERMINATION OF THERMAL CONDUCTIVITY
Kenneth G. Skinner, Washington, D.C., assignor to the United States of America as represented by the Secretary of the Navy
Continuation of abandoned application Ser. No. 126,353, July 24, 1961. This application Dec. 17, 1964, Ser. No. 434,728
4 Claims. (Cl. 73—15)

The invention described herein may be manufactured and used by or for the Government of the United States of America for governmental purposes without the payment of any royalties thereon or therefor.

This invention relates to an apparatus for determining the thermal conductivity of solids. More particularly, the invention is directed to a novel apparatus for rapid comparison of thermal conductivities of relatively small samples.

This application is a continuation of my copending application Serial No. 126,353, filed July 24, 1961.

Thermal conductivity has been found to be a valuable parameter of thermoelectric materials. The usefulness of any material which is being considered for possible use in thermoelectric power generation must be evaluated over a wide range of temperatures. Such evaluations are based upon the "thermoelectric figure of merit," Z, which varies inversely with the thermal conductivity: $Z=S^2/\rho K$ where S is the Seebeck coefficient of the material, $\rho$ is its resistivity and K is its thermal conductivity.

Although various techniques have been described in the literature for measuring thermal conductivity and many have been used in determining precision values of single materials, these prior methods have been found to be inconvenient where rapid, relative values are desired for screening a large number of sample materials. Precise measurements of thermal conductivities are difficult under any circumstances, but the difficulty increases considerably at high temperatures, and to an even greater extent, when only small samples are all that are available for screening purposes. Prior art methods usually employed comparatively bulky sample sizes, such as, 5-inch plates, 1- to 2-inch cubes or 2-inch diameter rods. Additionally, the prior art precision methods are laborious and time consuming, often requiring as much as one week to complete measurements from room temperature to 1200° C. Due to the necessity for evaluating as well as for controlling the fabrication of thermoelectric materials, it has been found highly desirable to provide some rapid, reliable screening technique to enable the investigator to select the more promising materials at his disposal for a more careful evaluation of their properties.

To this end, attempts have been made to use comparative methods, but invariably these methods required the exact measurement of distances or locations on bar samples. In one of these methods, for example, one end of a bar is immersed in molten metal, and the distance from the molten level to a point on the bar that reaches a predetermined temperature is taken as an indication of its thermal conductivity. This method, however, suffers from the serious disadvantage in attempting to measure accurately the distance from the molten metal line to a point where the predetermined temperature has been reached. Another major disadvantage resides in the difficulty involved in obtaining comparative data from more than one molten-metal temperature.

The present invention therefore provides a novel apparatus for rapid comparison of thermal conductivities of relatively small sample sizes, for example, of the order of about ¼ x ¼ x ½-inch pieces, for temperatures ranging from room temperature to 1350° C. and even higher.

A sample of given dimensions is initially positioned over a uniform opening in a laterally confined, heat-insulated space communicating with a radiant heat source and is then exposed to constant heat radiation. The amount of heat flow through a sample of given dimensions is determined by the temperature gradient between the exposed (hot) face and the opposite (cold) face thereof. If thermal conductivity, K, values of a sample of given dimensions are known, the values of other samples of similar dimensions may be compared or estimated. Unlike prior art methods in which linear measurements and accurate positioning of temperature-indicating devices were required on bar samples, the present method obviates the need for linear measurements and use of relatively long samples. Small bits of specimens having parallel top and bottom faces are conveniently compared for the thermal conductivity property by contacting said faces with temperature-indicating devices and recording their respective temperatures. In general, when a series of temperature differences between the top and bottom faces are obtained over a temperature range and plotted versus the corresponding mean temperature, a substantially representative graph may be obtained from which departure of individual points are seldom in excess of 5%.

Relative K values of thermal conductivity which are reproducible and sufficiently accurate at moderate to high temperatures, are obtained from reference or comparison standards, providing there is no wide divergence in the conductivity values between the reference materials and the unknown samples. Thermal conductivity data of several known materials should be available to provide close comparisons where the values can be approximated as greater, lower or in-between known comparison standards.

The comparator of the present invention includes a sample holder having a laterally confined space for positioning therein a relatively uniform sample. The bottom of the sample holder is provided with a uniform opening extending into and being somewhat smaller than the surface area of said laterally confined space. A sample piece positioned over said opening is laterally insulated by filling the space around the sample with a heat insulating powder to minimize heat loss. The exposed top and bottom sample faces are contacted by thermocouples to indicate corresponding surface temperatures; one thermocouple is contacted to the center of the bottom face, while another thermocouple is contacted in the same manner to the upper face thereof. When the sample holder is inserted in a heat zone, and the thermocouples are contacted to the respective faces of the sample, temperature readings are taken from the top and the bottom faces thereof through a wide range of temperatures.

The apparatus of the present invention may comprise a uniform heat source for heating a plurality of samples simultaneously to compare conductivity data. A plurality of sample holders are arranged over a heat source and a heating technique suitable for the purposes of the user may then be followed. For example, uniform heating rates may be observed in which case time readings will be taken at predetermined temperatures, or alternately the temperature readings may be taken at regular time intervals. In addition to the unknown samples, a reference specimen of measured thermal conductivity should be included for purposes of determining relative values for the unknowns. For routine control work and for screening purposes, only a few relative points are necessary to provide representative graphical data for determining comparative values.

With the foregoing in mind, it is an object of the present invention to provide a new and improved apparatus for determining relative thermal conductivity over a wide range of temperatures and employing relatively small samples.

Another object is to provide an apparatus for comparing heat conductivities with special emphasis on a rapid, reliable screening technique.

A further object is to provide a comparator of thermal conductivities which is efficient and economical in operation and with a minimum of heat losses.

These and other objects, advantages and novel features of the invention will be apparent from the following description and the accompanying drawings, in which:

FIG. 1 is a somewhat schematic diagram illustrating one portion of the comparator and its function in accordance with the invention;

FIG. 2 is a vertical cross section view of the comparator showing the heater arrangement in combination with sample holders shown in FIG. 1; and FIG. 3 is a perspective view of a preferred embodiment of the smaple holder used in the comparator.

Referring to FIG. 1, the invention is illustrated schematically by a comparator 10 that compares the thermal conductivities of samples $S_1$ and $S_2$. The sample $S_1$, for instance, pertains to a material of unknown thermal conductivity and the temperature data obtained will be compared to the temperature data of sample $S_2$, which is a standard material of known heat conductivity or a reference material. The samples $S_1$ and $S_2$ are supported in sample holders 12 and 13, respectively, while the space around said samples it filled with a heat insulating powder 11, for example, zirconia powder of minus 325 mesh has been found suitable for minimizing lateral heat loss. The sample holders, which are formed of a heat-insulating ceramic composition, such as bubble alumina ($Al_2O_3$) or zirconia ($ZrO_2$), are inserted between insulating bricks 14 which are suitably arranged to accommodate said sample holders. A heat source is directed toward the lower exposed surfaces of the samples through a diffuser or baffle plate of a ceramic material, such as, silicon carbide, to decrease temperature gradients across the exposed surfaces of the samples.

After the samples to be compared are placed in the holders and the powder is poured and tamped lightly around the samples, thermocouples 15 and 16 are contacted to the top and bottom faces of each sample. The thermocouple wires are preferably made of platinum and of platinum containing about 10% rhodium, annealed and calibrated for E.M.F. output. The wires are electrically insulated with a high temperature ceramic tubing and their ends are welded together and formed into a spherical junction. The thermocouples are positioned so that the spherical junction touches the face surface at approximately the midpoint. To provide a uniform thermocouple contact, identical weights 17, for example, of 100 grams, are attached to each of the thermocouples 15. The E.M.F. of each thermocouple is measured by means of a precision potentiometer and a null-point indicator.

In operating the comparator, as the heat source is gradually raised in temperature, sample temperature readings from the lower and upper faces of the samples are recorded through a given range of temperatures. The relative conductivity values of the unknown sample may then be calculated from the relationship:

$$K_u = \frac{(t_3 - t_4) K_s}{(t_1 - t_2)}$$

where $K_s$ is the thermal conductivity of the standard,
$K_u$ is the thermal conductivity of the sample,
$t_1$ and $t_2$ are the hot and cold face temperatures, respectively, of the standard, and
$t_3$ and $t_4$ are the hot and cold face temperatures, respectively, of the sample.

In accordance with the teachings of the present invention, a comparison of materials having similar thermal conductivity characteristics can be made when corresponding sides of said materials are exposed to a heat source and the opposite sides thereof are exposed to room temperature, and, therefore, a comparison of their respective temperature differences, $\Delta t$ values, i.e. the difference of their hot and cold faces is indicative of their relative thermal conductivities. A visual comparison of their respective temperature curves may provide the necessary evaluation.

The samples as well as the sample holders should be adequately shielded to minimize lateral heat flow. In order to do this the samples are positioned in a suitable heater, the comparator apparatus 18 illustrated in FIG. 2 comprises an insulating shell 19, made of transite or any heat insulating material and maintained structurally by means of angle irons 21, the bottom of the insulating shell is supported by means of footings 22. The insulating shell 19 is heat-insulated internally by stacking bricks 30 of heat-insulating material to fill all available space therein. A pair of sample holders 23 and 24 adapted to support therein samples 25 are inserted between insulating bricks 30a which are arranged on top of the apparatus. Electric heat is supplied below the samples by a specially designed heater: insulating bricks 26 which are stacked under the sample holders are arranged with annular grooves 27 cut into the brick composition, each groove retaining therein a coil of resistance wire 28, for example, of B&S gauge No. 6 Kanthal A–1 wire and said coils are connected in series, the connections between the coils and also the leads through the insulating brick consists of B&S gauge No. 1 Kanthal A–1 wire. Power input is conveniently controlled by a variable transformer from 20 to 120 volts, single phase, from 1 to 40 amp. The power input depends upon the heat required and the heating rate. These arrangements provide a heat sink which is restricted in heat flow on the sides and the bottom but which allows the heat to flow upward through a diffuser plate 29 which may be a silicon carbide plate that minimizes temperature gradients across the top of the sink. A thermocouple 31 is positioned within the heat zone for controlling the heat output of the electric heater.

FIG. 3 shows the structure of a preferred embodiment of a sample holder 23 composed of a heat insulating ceramic composition such as bubble alumina or zirconia, said holder has a rectangular opening 32 on the bottom surface thereof. A ledge 33 surrounding the rectangular opening provides a support surface for positioning a sample. The sample dimension therefore should be slightly larger in area than the rectangular opening. The flat wall surface 34 forms a confining space in which the sample is positioned and the surrounding space between holder and sample is filled with the heat-resistant powder, as mentioned hereinbefore.

As stated above, the sample confined in the sample holder is subjected to uniform radiant heat at the opening. Heat flow is thus restricted to conduction through the sample area exposed at the opening.

While a specific sample holder has been illustrated herein, by way of example, having a rectangular opening therein, and reference is had to a given sample size, it is to be understood that the invention is equally applicable to sample holders having uniform openings of any desired configuration and that other sample dimensions may also be used within the scope of the invention.

The apparatus described herein when applied to solid materials for comparing their thermal conductivities is (a) capable of an accuracy within a few percent, (b) measurements can be made over a wide temperature range and (c) the comparison is applicable to materials whose thermal conductivity coefficients are not widely divergent.

Since the invention described herein can be variously practiced without departing from the spirit and scope thereof, it is intended that specific embodiments of the invention appearing in the above description shall be

What is claimed is:

1. An apparatus for comparative determination of the thermal conductivity of solid materials comprising in combination:
   means including a ceramic structure defining a vertically disposed heat-insulated cavity of uniform cross-section in said ceramic structure,
   ceramic means extending into said cavity for closure of said cavity at the upper end thereof,
   said ceramic closure means having a pair of laterally spaced, vertically disposed passageways defined therein which extend therethrough for communication with said cavity,
   a heat refractory plate extending horizontally across the upper portion of said cavity near said passageways for minimizing temperature gradients in radiant heat flowing to said passageways from said cavity,
   and means including open-ended ceramic sample holders for supporting a solid material sample of like rectangular shape and dimensions in each of said passageways with the undersurface of each of said samples in the same horizontal plane and with a corresponding portion of like area and rectangular configuration of each of said sample undersurfaces exposed to said cavity.

2. An apparatus as defined in claim 1, wherein said refractory plate is a ceramic plate.

3. An apparatus as defined in claim 2, having means in said cavity for generation of radiant heat therein at a controlled rate.

4. An apparatus as defined in claim 3, wherein said open-ended ceramic holders have a first rectangular-shaped recess and a succeeding lower rectangular-shaped recess forming part of the passageway therethrough,
   said first rectangular-shaped recess having a depth approximately equal to the height of the sample of the solid to be contained therein and lateral dimensions greater than those of said sample,
   and said succeeding lower rectangular-shaped recess having lateral dimensions slightly less than those of said sample.

References Cited by the Examiner

UNITED STATES PATENTS

| | | | |
|---|---|---|---|
| 73,407 | 12/1868 | Thomas | 263—4 |
| 1,845,497 | 2/1932 | Hanson | 13—20 |
| 2,480,324 | 10/1949 | Gold | 263—47 |

RICHARD C. QUEISSER, *Primary Examiner.*

J. W. MYRACLE, *Assistant Examiner.*